Patented Aug. 7, 1934

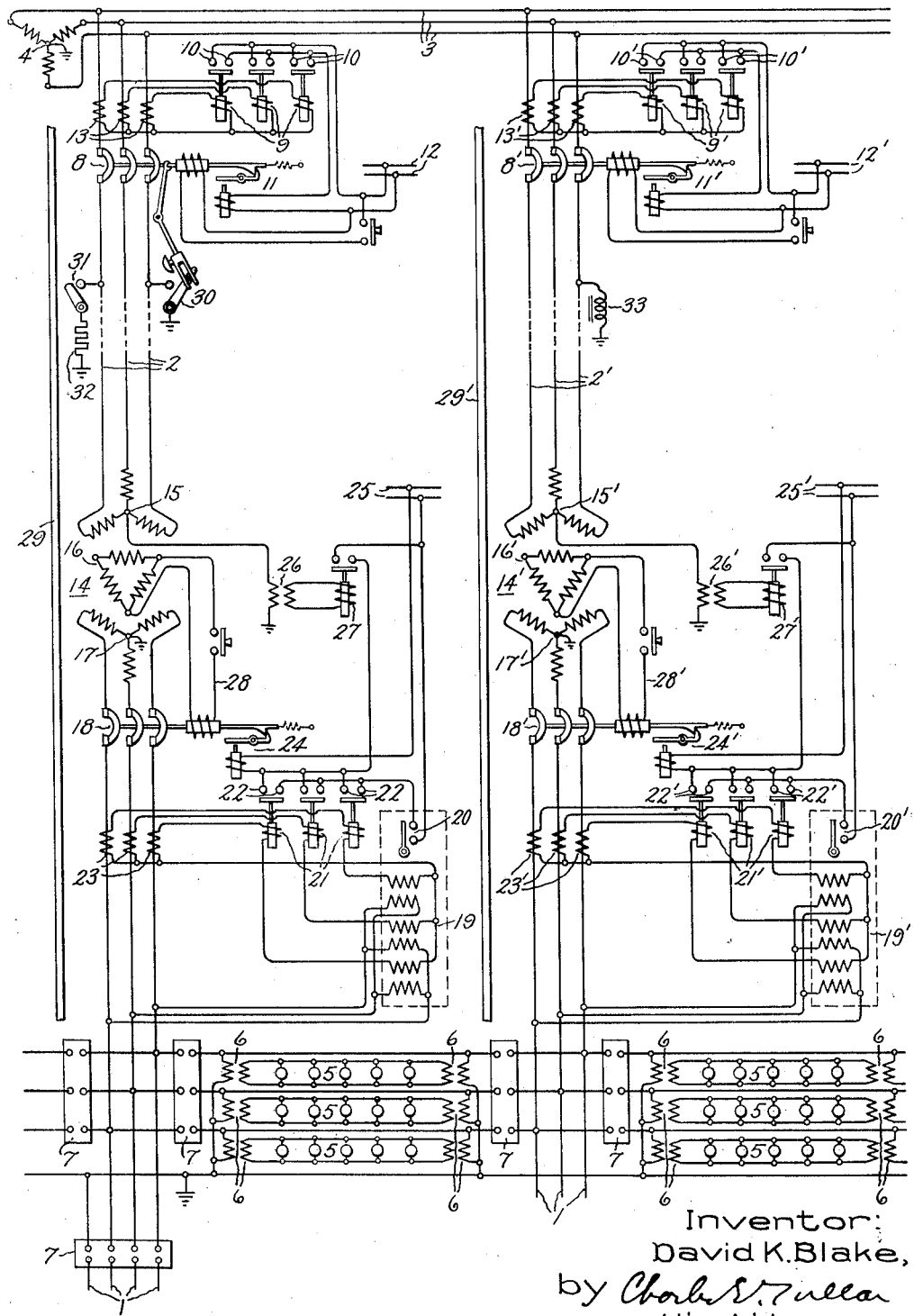

1,969,542

UNITED STATES PATENT OFFICE 1,969,542

ELECTRICAL DISTRIBUTION SYSTEM

David K. Blake, Schenectady, N. Y., assignor to General Electric Company, a corporation of New York Application March 16, 1931, Serial No. 523,142
Renewed February 6, 1934

20 Claims. (Cl. 171—97)

My invention relates to alternating current electrical distribution systems and particularly to the control and protection of systems including distribution networks.

In my copending application on an electrical protective system (d–47,889), S. N. 523,141, filed March 16, 1931, and assigned to the assignee of the present application I have disclosed and claimed a ground fault protective arrangement for a distribution system employing a plurality of high voltage feeder circuits which are connected to energize a special distribution network through step-down transformers. This ground fault protective arrangement, which is associated with other fault responsive means for the feeder circuits, operates on a reverse power flow through the feeder step-down transformers when a ground fault occurs. To permit this reverse power to flow when a ground fault occurs I have solidly grounded the neutral point of the primary windings of the step-down transformers which, as a consequence, are star-connected. I have also provided the transformers with mesh connected tertiary windings so as to provide low reactance paths for the flow of third harmonic currents, which if allowed to flow in the conductors of the feeder circuits will produce objectionable interference in adjacent telephone circuits.

This arrangement operates best when the reactance of the tertiary winding is low with respect to the resistance of the parallel ground path for the third harmonics in the exciting current of the transformer and when there are no third harmonics in the voltage applied to the feeder for in that case practically all of the third harmonic currents will flow in the tertiary winding. If, however, third harmonic voltages are produced by the generator or step-up transformer the tertiary winding provides a low reactance path for them with the result that they will flow through the feeder conductors. Also, if the ground resistance is low an additional low resistance path will be provided for the flow of third harmonic currents, both those which are generated and those contained in the transformer magnetizing current, through the feeder conductors.

In accordance with one feature of my invention I prevent the flow of these third harmonic currents by grounding the neutrals of the primary windings of the step-down transformers through high impedances, such as potential transformers, and control the tripping of the circuit breakers on the occurrence of a ground fault in response to the voltage across these impedances.

In accordance with another feature of my invention I provide means for controlling the tripping of circuit breakers at the network ends of the feeders from the source or generator ends of the feeders through operation of the ground fault responsive means.

It is an object of my invention to provide a new and improved control and protective arrangement for electrical distribution systems.

Another object of my invention is to provide a new and improved ground fault protective system for electrical distribution systems.

A further object of my invention is to provide novel remote control arrangements for systems of electrical distribution employing feeder circuits.

An additional object of my invention is to provide a novel protective and control arrangement for a network distribution system, said protective arrangement including cooperating ground fault and reverse power and overload protective means.

My invention will be better understood from the following description taken in connection with the accompanying drawing and its scope will be pointed out in the appended claims.

Referring now to the single figure of the accompanying drawing wherein I have diagrammatically illustrated my invention as applied to a distribution system comprising a medium voltage three-phase, four-wire distribution network 1 which is supplied with energy through feeder circuits 2 and 2' which in turn are energized from bus 3. This bus is shown as connected to a three-phase grounded neutral alternating current generator or transformer 4.

As the protective and transforming equipment associated with each of the feeders is the same, only equipment associated with feeder 2 will be described in detail and corresponding elements in feeder 2' will be designated by corresponding primed characters. Network 1 is preferably a medium voltage distribution network from which low voltage loads 5 are tapped to distribution transformers 6. These low voltage load circuits may or may not be connected into a network. Switches or circuit breakers 7 are provided for sectionalizing the network in case of faults thereon.

At the high voltage end of feeder 2 is inserted a switch or oil circuit breaker 8. For automatically tripping this breaker when a fault occurs on feeder 2 I provide a simple overload protective relay arrangement consisting of overload relays 9 whose contacts 10 are connected in parallel in a circuit including tripping means 11 of circuit breakers 8 and a suitable source of operating current such as supply bus 12. Overload relays 9 are connected to feeder 2 in any well known manner, such as by current transformers 13.

A transformer 14 for stepping down the voltage of the feeder circuit to the voltage of the medium voltage network is provided with a star-connected primary winding 15, a tertiary delta connected winding 16, and a star-connected secondary winding 17. As network 1 is a four-wire three-phase network the neutral point of the secondary winding of transformer 14 is solidly grounded as shown.

A medium voltage transformer circuit breaker or switch 18 is connected between the secondary winding 17 of the transformer 14 and the network 1.

The relay arrangement which I employ for tripping breaker 18 when an ordinary fault, such as a line-to-line short circuit, occurs on feeder 2 comprises a well known reverse power overload relay arrangement. This arrangement comprises a reverse power relay 19, having contacts 20, and over-current or overload relays 21, having contacts 22 which are connected in parallel with each other. Reverse power relay 19 is essentially a three-phase watt-hour meter and as shown it is connected to feeder circuit 2 in such a way that its current elements respond to the current in feeder circuit 2 through connection to current transformers 23, while its potential elements are shown as connected directly across the conductors of feeder 2. By connecting tripping means 24 of breaker 18 in a series circuit including contacts 20 of power relay 19, contacts 22 of over-current relays 21 and a suitable source of operating current, such as a supply bus 25, it will be seen that the tripping mechanism 24 will be operated whenever the reverse power flow from the network 1 through the breaker 18 and the transformer 14 exceeds a certain value. This will occur, for example, when a fault exists on feeder circuit 2 for in that case the energy supplied by feeder 2' to the network will flow back through the breaker 18 and transformer 14 to the fault.

The ground fault relay arrangement for controlling the operation of tripping means 24 comprises a high impedance element connected between the neutral point of primary winding 15 and the ground and means which operates in response to the voltage across this high impedance for completing a tripping circuit. In the illustrated embodiment this means comprises a high impedance potential transformer 26 whose primary winding is connected between the neutral point of primary winding 15 of power transformer 14 and the ground, and whose secondary winding is connected to the operating element of a suitable relay 27, which when energized is arranged to short-circuit contacts 20 of the power relay and the contacts 22 of the overload relays 21, thereby completing a circuit from source 25 to tripping means 24.

Circuit breaker 18 is provided with any suitable reclosing means 28 which may either be of the well known automatic type or manually operated, as illustrated. The illustrated feature of energizing the reclosing means from the tertiary delta winding which provides a convenient source of power at a suitable voltage is disclosed and claimed in my above mentioned copending application.

Paralleling feeder circuit 2 is a telephone cable 29 in which interference will occur if third harmonic currents are allowed to flow in feeder 2.

In many cases it may be desirable to control the tripping of circuit breaker 18 from the high voltage end of feeder circuit 2, as for example, when it is desired to make repairs on the circuit. One such means I have illustrated as a grounding switch 30 connected between the ground and one of the conductors of circuit 2. The switch may either be manually operable as shown or it may be arranged to operate automatically with breaker 8 through any simple connection, mechanical or electrical. One such mechanical connection is shown by the pivoted operating lever 34, which is provided with a latch 35 for selectively connecting the switch 30 to be operated by the lever 34. By closing this switch the ground fault responsive means associated with breaker 18 will be operated to open the breaker. Another arrangement for accomplishing the same purpose is a switch 31 which will connect one of the conductors of feeder 2 to ground through a resistance 32. This arrangement would tend to limit the current flowing in a line-to-line short-circuit which would be formed in case one of the other conductors of feeder 2 is already grounded. Still another means for automatically securing this remote control of the low voltage circuit breaker is shown associated with feeder 2' and comprises a high impedance element such as a reactor or transformer 33 connected between one of the conductors of feeder 2' and the ground. This impedance is so high that it limits the current flow therethrough to a negligible value. At the same time this impedance is low with respect to the value of impedance 26'. Through this arrangement breaker 18' will be tripped automatically as soon as breaker 8' is tripped in a manner which will hereafter be described.

The operation of the above described arrangement is as follows: Assume that transformer 4 is energized from any suitable source of current supply, that all the breakers are closed and that loads are connected to network 1. Under these conditions power will flow from bus 3 through feeders 2 and 2' to the network 1 and then to the various low voltage loads. If now an ordinary fault, such as a line-to-line short-circuit, occurs on one of the feeders, say feeder 2 for example, the heavy rush of fault current will operate the overload tripping means for breaker 8, thereby causing this breaker to open. At the same time reverse power will flow through the breaker 18 and transformer 14 into the fault from network 1 as previously described. The current will be of high value and will operate both the reverse power relay 19 and the overcurrent relays 21 to trip breaker 18 and thereby isolate the faulty feeder 2. The reason that over-current relays 21 are employed is that voltage transients due to switching operations on the network 1 may sometimes cause momentary rises in voltage on the network which in turn will cause momentary power reversal in feeder 2. However as these momentary transient power reversals will usually be much less than full load power, they will do no damage and consequently it would not be desirable to have breaker 18 tripped whenever one of these transients occurs.

If now a ground fault occurs on feeder 2, the following action will take place. Due to the fact that the high voltage supply for feeder 2 is a grounded neutral system, there will be a rush of current through the grounded conductor, which will operate one of the over-current relays 9 and which will then trip breaker 8. At the same time, the grounding of one of the conductors of feeder 2 acts to connect the primary winding of transformer 26 directly across one of the phases of primary winding 15 of the power transformer, with the result that a voltage is impressed thereon and this voltage will cause relay 27 to operate and thereby trip breaker 18. By providing the high impedance path comprising transformer 26 for the third harmonic currents which tend to flow in the conductors of circuit 2, it is possible practically to eliminate these currents, which otherwise would cause interference in telephone cable 29. At the same time, simple ground fault responsive means are provided for tripping the circuit breaker 18.

Assuming normal conditions on the feeder circuit 2, that is to say, with power flowing from transformer 4 to feeder 1 through the closed circuit breaker and the transformer 14, the operation of the control means for tripping breaker 18 from the high voltage end of the feeder, will be obvious for these means provide controllable grounding arrangements for one or more of the conductors of circuit 2 thereby to cause the ground fault responsive tripping means to operate in the manner which has already been described.

The operation of the high impedance means 33 associated with feeder 2', however, is considerably different, and is as follows: Due to the fact that the transformer 14' has its secondary winding star-connected with the neutral grounded, the voltage to ground of all of the conductors of feeder 2' will be substantially the same due to the fact that the impedance of element 33 is high. Also most of the current flowing through impedance device 33 will return through ground and through one of the leg windings of the secondary winding of transformer 14' rather than returning through the primary winding of transformer 26' because the former is a much lower impedance path than the latter. This connection will therefore produce little or no voltage drop across the primary winding of transformer 26'. However, as soon as circuit breaker 8' is open the only path for the return current through impedance device 33 is through ground and back through the primary winding of impedance device 26'. As a result a series circuit is set up including impedance devices 33 and 26' and as the impedance of 26' is large with respect to the impedance of 33 most of the voltage drop in this circuit will appear across impedance device 26' with the result that the ground fault tripping means for breaker 18' will be operated in the manner which has already been described. This arrangement therefore operates automatically to trip breaker 18' as soon as breaker 8' has been tripped. Furthermore, the operation of this arrangement is not accompanied by the flow of high ground or short-circuit current.

While I have shown and described particular embodiments of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, a polyphase transformer having a secondary winding and a star-connected primary winding, a circuit breaker connected to said secondary winding, a potential transformer having its primary winding connected between the neutral point of said primary winding and the ground, and means responsive to the voltage of the secondary winding of said potential transformer for tripping said breaker.

2. In combination, a polyphase transformer, having star-connected primary and secondary windings and a mesh-connected tertiary winding, a circuit breaker connected to said secondary winding, a potential transformer having its primary winding connected between the neutral point of said primary winding and the ground, and means responsive to the voltage of the secondary winding of said potential transformer for tripping said breaker.

3. In combination, a polyphase transformer having a secondary winding and a star-connected primary winding, a circuit breaker connected to said secondary winding, a high impedance transformer having its primary winding connected between the neutral point of the primary winding of said polyphase transformer and ground, and tripping means for said circuit breaker connected to the secondary winding of said high impedance transformer.

4. In combination, a polyphase transformer having star-connected primary and secondary windings and a mesh-connected tertiary winding, a circuit breaker connected to said secondary winding, a high impedance transformer having its primary winding connected between the neutral point of the primary winding of said polyphase transformer and ground, and tripping means for said circuit breaker connected to the secondary winding of said high impedance transformer.

5. In combination, a polyphase grounded neutral source of current, a polyphase grounded neutral distribution network, a feeder circuit connecting said source to said network, said circuit including a transformer having grounded neutral star-connected primary and secondary windings, the neutral of the primary winding being grounded through a high impedance, a circuit breaker for disconnecting said feeder circuit from said network, and means responsive to the voltage across said high impedance for tripping said breaker.

6. In combination, a polyphase grounded neutral source of current, a polyphase grounded neutral distribution network, a feeder circuit connecting said source to said network, said circuit including a transformer having grounded neutral star-connected primary and secondary windings and a mesh-connected tertiary winding, the neutral of the primary winding being grounded through a high impedance, a circuit breaker for disconnecting said feeder circuit from said network, and means responsive to the voltage across said high impedance for tripping said breaker.

7. In combination, a polyphase grounded neutral source of current supply, a polyphase grounded neutral distribution network, a feeder circuit connecting said source and said network, circuit breakers at each end of said feeder circuit, overload responsive means for tripping the breaker at the source end of said feeder circuit, reverse power means for tripping the breaker at the network end of said feeder circuit, a step-down transformer in said feeder circuit, said transformer having a star-connected grounded neutral primary winding, the neutral of said primary winding being grounded through a high impedance, and means responsive to the voltage across said impedance for also tripping the breaker at the network end of said feeder.

8. In combination, a polyphase grounded neutral source of current supply, a polyphase grounded network distribution network, a feeder circuit connecting said source and said network, circuit breakers at each end of said feeder circuit, overload responsive means for tripping the breaker at the source end of said feeder circuit, reverse power means for tripping the breaker at the network end of said feeder circuit, a step-down transformer in said feeder circuit, said transformer having a star-connected grounded neutral primary and secondary windings and a mesh-connected tertiary winding, the neutral of said primary winding being grounded through a high impedance, and means responsive to the voltage across said impedance for also tripping the breaker at the network end of said feeder.

9. In combination, a feeder circuit having a circuit breaker at one end thereof, ground fault responsive means for tripping said breaker, and means at the other end of said feeder for causing said ground fault responsive means to trip said breaker open.

10. In combination, a polyphase feeder circuit having a source end and a load end, a switch at the load end of said feeder, ground fault responsive means for opening said switch, and means at the source end of said feeder circuit for causing said ground fault responsive means to open said switch.

11. In combination, a polyphase feeder circuit having a source end and a load end, ground fault responsive means for disconnecting the load end of said feeder circuit, and means at the source end of said feeder for grounding one of the conductors of said feeder circuit.

12. In combination, a feeder circuit having a source end and a load end, a circuit breaker at the load end of said feeder circuit, ground fault responsive means for tripping said breaker open, and means at the source end of said feeder circuit for grounding one of the conductors of said circuit through a high impedance.

13. In combination, a grounded neutral polyphase current supply, a load, a feeder circuit connecting said source to said load, circuit breakers at each end of said feeder, a step-down transformer in said feeder circuit, said transformer having a star-connected primary winding, ground fault responsive tripping means for the circuit breaker at the load end of said feeder including high impedance voltage responsive means connected between the neutral of said primary winding and the ground, and a high impedance connected between one of the conductors of said feeder circuit and the ground.

14. In combination, a grounded neutral polyphase supply, a polyphase circuit, a normally closed circuit breaker connecting said circuit to said supply, a second normally closed circuit breaker in said circuit, a transformer having star-connected primary and secondary windings connected in said circuit, high impedance means connected between the neutral of the primary winding and the ground, means responsive to the voltage across said means for tripping said second breaker, means adjacent said first breaker connecting one of the conductors of said circuit to ground, said means having an impedance which is low with respect to the impedance of said first mentioned high impedance means but which is high enough to prevent an appreciable unbalance of the voltage to ground of said circuit.

15. In combination, a grounded neutral source of current supply, a transformer, circuit conductors connecting said source to the primary winding of said transformer, a plurality of relatively high impedances connected respectively between ground and different points on the primary winding of said transformer, and an electro-responsive device connected to respond to the voltage across one of said impedances.

16. In combination, a solidly grounded neutral source of current supply, a transformer having a primary winding and a secondary winding, means for connecting said source to said primary winding, a circuit breaker connected in circuit with the secondary winding of said transformer, a pair of relatively high impedances connected respectively between ground and different points on the primary winding of said transformer, and means responsive to the voltage across one of said impedances for tripping the circuit breaker which is in circuit with said secondary winding.

17. In combination, a solidly grounded neutral source of current supply, a load having a counter voltage, a transformer having a primary winding and a secondary winding, means including a circuit breaker connecting said source to the primary winding of said transformer, means including another circuit breaker for connecting the secondary winding of said transformer to said load, a pair of relatively high unequal impedances connected respectively between ground and different points on the primary winding of said transformer, and means responsive to the voltage across one of said impedances for tripping open the circuit breaker between said load and said secondary winding.

18. In combination, a feeder circuit including a voltage step-down transformer, a circuit breaker connected in said circuit on the low voltage side of said transformer, and means for controlling the tripping of said breaker including a switch for grounding the high voltage side of said feeder.

19. In combination, a feeder circuit having a voltage step-down transformer therein, a circuit breaker in the low voltage end of said feeder, ground fault responsive means for tripping said breaker, and means for grounding the high voltage side of said feeder for causing actuation of said ground fault responsive means.

20. In combination, a feeder circuit including a voltage step-down transformer, a circuit breaker connected in said circuit on the low voltage side of said transformer, and means including manually controllable means for grounding said feeder on the high voltage side of said transformer for causing tripping of said breaker.

DAVID K. BLAKE.